Aug. 7, 1934.   R. M. NARDONE   1,969,661
TRANSMISSION
Original Filed March 30, 1932   2 Sheets-Sheet 2

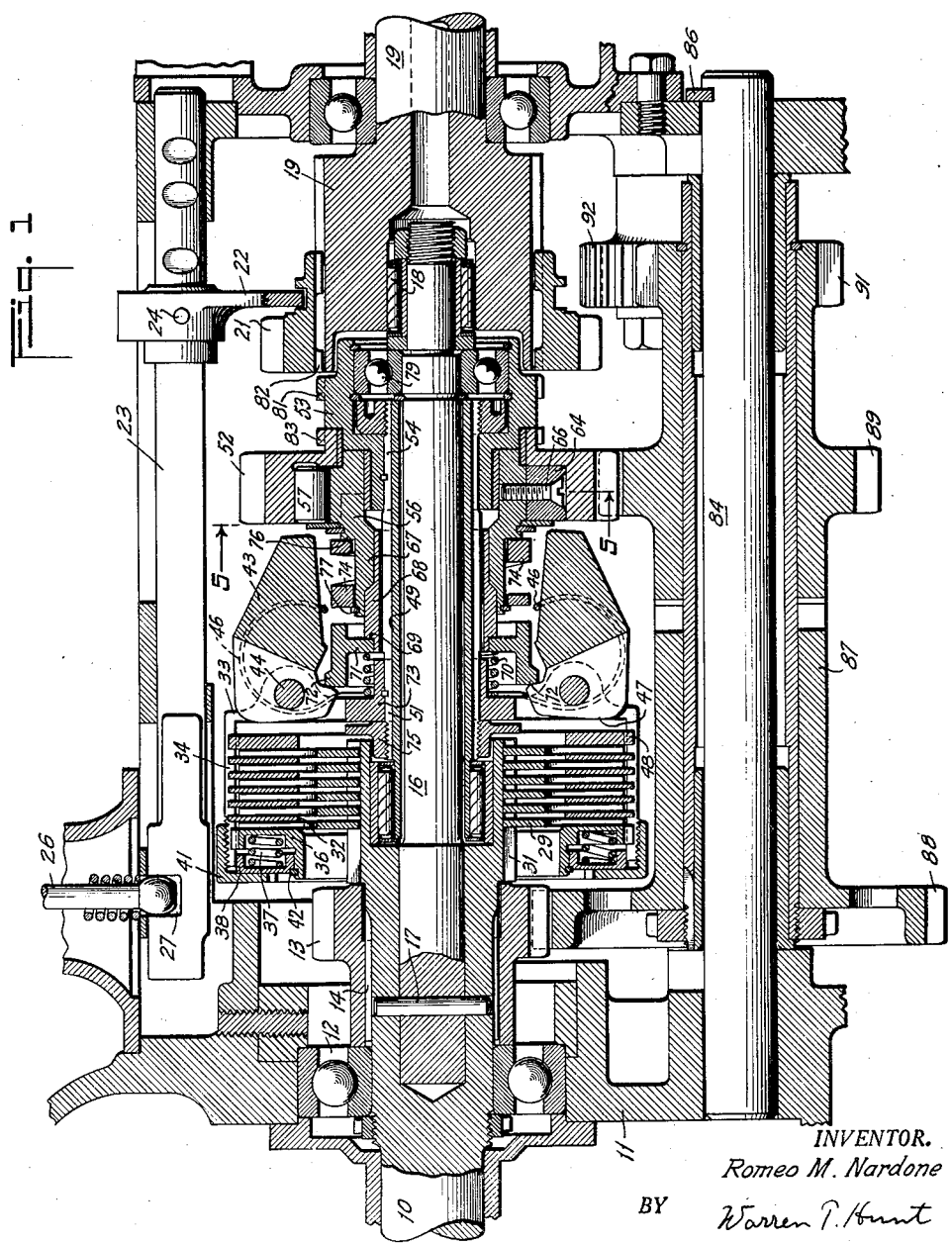

INVENTOR.
Romeo M. Nardone
BY Warren T. Hunt
ATTORNEY.

Patented Aug. 7, 1934

1,969,661

UNITED STATES PATENT OFFICE 1,969,661

TRANSMISSION

Romeo M. Nardone, East Orange, N. J., assignor, by mesne assignments, to Eclipse Aviation Corporation, East Orange, N. J., a corporation of New Jersey Application March 30, 1932, Serial No. 602,056
Renewed January 5, 1934

22 Claims. (Cl. 74—59)

This invention relates to power transmission mechanisms, and more particularly to an automatic variable speed power transmission mechanism.

An object of the invention is to provide an automatic variable speed transmission mechanism adapted to vehicle use in which the speed changes are made in accordance with the load on the driven shaft.

Another object of the invention is to provide an automatic variable speed transmission mechanism in which the gear or speed changes are controlled by the driven shaft speed preferably through the action of centrifugal weights.

Another object of the invention is to provide an automatic variable speed transmission in which the gear or speed changes are made in accordance with the combined action of the load and speed of the driven shaft.

Another object of the invention is to provide an automatic variable speed transmission mechanism with a novel high speed clutch having centrifugal weights which are held in their inner position when the low speed gear is engaged in order to completely disengage the high speed clutch.

Another object of the invention is to provide an automatic variable speed transmission mechanism with a centrifugally actuated clutch in which the engagement of the friction members is cushioned by a resilient backing plate.

Another object of the invention is to provide an improved friction clutch for a transmission in which there is a provision for lubricating the clutch plates.

Another object of the invention is to provide an improved centrifugal clutch in which the centrifugal force is modified at certain clutch speeds.

Other objects and features of the invention will be apparent from the following description, in connection with which a preferred embodiment of the invention has been illustrated in the accompanying drawings, in which:

Fig. 1 is a vertical longitudinal section of the improved transmission, showing the transmission with the centrifugal weights in their inward position;

Figure 5:
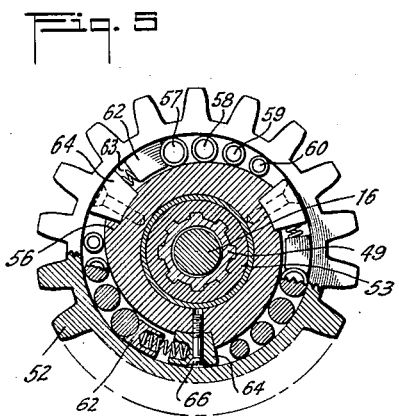
Fig. 5 is a sectional view of the overrunning clutch taken on line 5—5 of Fig. 1.

Referring to the drawings, 10 is the transmission driving shaft rotatably mounted in the transmission housing 11 by bearing 12 and to which is secured a gear or pinion 13 having a splined connection with the shaft at 14. An extension 16 of the driving shaft preferably extends in a rearward direction which may be made integral with the shaft 10 if desired, but which in the present connection is formed from a separate piece and secured thereto by a pin 17, the rear end being supported in bearing 18 and rotatable with respect to the driven or vehicle propelling shaft 19, to which is secured a slidable gear 21 adapted to be moved axially of the shaft by means of yoke 22 secured to the shifter rod 23 by a pin 24. Shifter rod 23 is adapted to be moved manually by means of a lever 26, the end of which engages a slot 27 formed in the end of the shifter rod 23.

A plurality of clutch plates or discs 29 are secured to the driving shaft 10 and are slidable thereon by means of splines 31, and disposed between intermediate adjacent plates 29 are a plurality of driven plates 32 which are secured to the clutch housing 33 by splines 34. The backing plate 36, against which the clutch plates 29 and 32 are clamped in their engaged position, is preferably resiliently mounted with respect to the plates and to that end a plurality of springs 37 are distributed around the periphery of the backing plate 36 and adapted to urge it toward the plates by the coaction of the springs against ring member 38, which is adjustably secured to the clutch housing 33 by a threaded nut 41; the backing plate being preferably held against movement beyond a predetermined point by lock ring 42.

Figure 2:
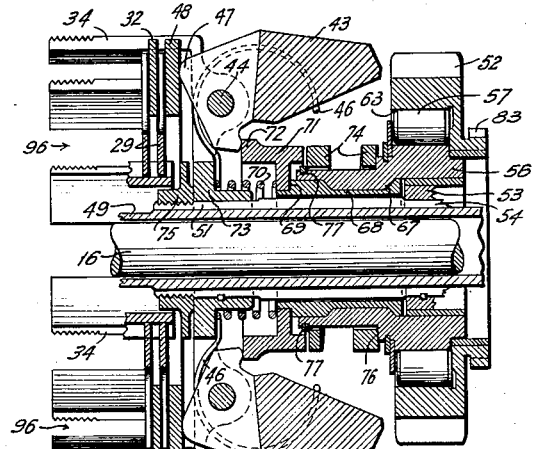
Fig. 2 is a view of the clutch housing and centrifugal weight assembly shown in Fig. 1 and illustrating the weights in their outward position corresponding to that obtained in high gear operation.

As best seen in Figs. 1 and 2, a plurality of centrifugal weights 43 are pivotally mounted on the opposite end of housing 33 by pins 44, the weights being normally urged to their outer position by springs 46, one end of which is secured to the housing 33, and having their cam faces 47 adapted to engage pressure plate 48 of the clutch to urge the discs 29 and 32 against the resilient backing plate 36. Springs 46, which permit running in high gear at low engine speeds with light loads, preferably exert only a slight force upon the weights 43 and are not of sufficient strength in themselves to engage the clutch to a degree whereby the friction is great enough to transmit motion to the driven shaft 49 under full engine torque. Housing 33 is connected to driven shaft 49 through splines 51, and in the present embodiment shaft 49 is in the form of a sleeve loosely mounted over driving shaft extension 16.

A second speed gear 52 is rotatably mounted upon coupler 53 that is secured to the driven shaft 49 by splines 54. Gear 52 is drivably connected with its inner race member or hub 56 through an overrunning clutch including rollers 57, 58, 59, and 60 which are urged in a clockwise direction, as shown in Fig. 5, by spring pressed block 62 normally located within the tapered groove 63 by a member 64 secured to hub 56 by screw 66.

The operation of the overrunning clutch is well understood by those skilled in the art, and no further explanation is necessary other than to say that if the gear 52 be rotated in a clockwise direction, as viewed in Fig. 5, the rollers 57, 58, 59, and 60 will be wedged into driving relation and motion will be transmitted to the hub 56, but if hub 56 should have a tendency to overrun gear 52, the rollers will assume their inoperative position and relative motion between the hub 56 and gear 52 is permitted.

Gear hub 56 is provided with a coarse threaded portion 67 which engages a similar threaded portion formed in sleeve 68 that has a splined connection with the driven shaft 49, sleeve 68 being provided with an annular shoulder 69 adapted to contact collar 71 that is normally urged toward the rear by spring 70 coacting between the collar 71 and hub 73 of the housing 33, said hub being securely splined to shaft 49, and backed up by a nut 75. Collar 71 has its front face 72 engaging the weights 43 is a manner to force them to their inner position when collar 71 is moved toward the left, as viewed in Figs. 1 and 2, by means of the threaded sleeve 68. The rear portion of collar 71 is adapted to engage a spring 74 normally held under compression against shoulder 76 of hub 56 by a lock ring 77; spring 74 being so positioned that it will not be engaged by collar 71 until weights 43 have been moved some distance outwardly, the purpose of the spring being to counteract or modify the centrifugal force of weights 43 at some predetermined point in their outward travel which preferably corresponds to a predetermined speed of the vehicle. If desired, spring 74 may be omitted but its use has been found to be advantageous.

Coupler 53 is rotatably mounted upon driving shaft extension 16 by bearing 79 and is provided with teeth 81 adapted to engage with the internal teeth 82 of the slidable gear 21, and gear 52 is provided with teeth 83 adapted to engage teeth 82 when it is desired to lock gear 52 to the driven shaft 19 in order to use the engine as a brake in second speed or as a positive second gear; the operation of which will be more fully described hereinafter.

A countershaft 84 is mounted in transmission housing 11 and held in position by any desired means, such as key 86, upon which is rotatably mounted a sleeve 87 preferably having gears 88, 89, and 91 integrally formed therewith. Gear 88 is in mesh with gear 13 and gear 89 is in mesh with gear 52; gear 91 being in mesh with idler reverse pinion 92.

Figure 3:
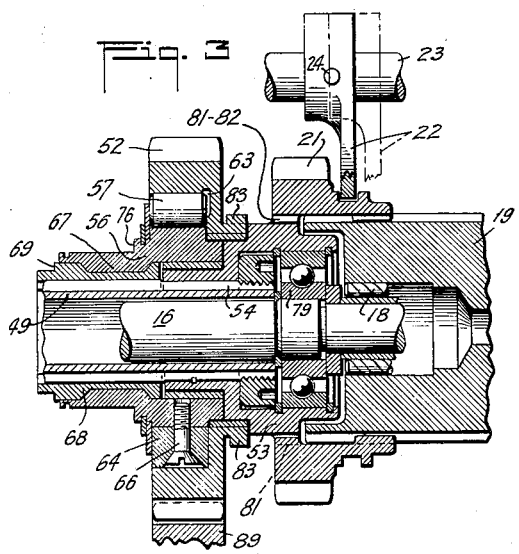
Fig. 3 is a view of the rear portion of the transmission illustrating the normal position of the gears for forward motion of the vehicle.

In the operation of the mechanism, starting from a position of rest, as illustrated in Fig. 1, gear 21 is moved toward the left into a position whereby teeth 82 mesh with teeth 81, as shown in Fig. 3, which is the forward motion position of the transmission. Rotary motion of shaft 10 will then be transmitted to the driven shaft 19, if the clutch slips under load, by means of gears 13, 88, 89, and 52, which last named gear will transmit movement to its hub 56 through rollers 57, 58, 59, and 60 of the overrunning clutch and to the driven shaft 49 through the sleeve 68 which moves to the left to force the weights inwardly by means of the coacting threaded portions of the sleeve and hub; the shaft 49 in turn driving coupler 53 and gear 21 which is secured to the driven or propelling shaft 19.

Rotation of the driven shaft 49 is also transmitted to the clutch housing 33, and rotation of the clutch housing will cause weights 43 to move outwardly, as shown in Fig. 2, which outward movement will force the clutch discs 32 and 29 into contact against the resilient backing plate 36 and enable the drive to be taken directly from the driven shaft 10 to the clutch housing 33. Under these conditions, sleeve 49 will be driven at a higher speed than the gear 52 and the aforementioned overrunning clutch will permit driven shaft 49 and hub 56 to overrun the slower driven low speed gear 52.

If for any reason the load on the propelling shaft 19 should increase beyond the predetermined capacity of the clutch, the second speed gear 52 will take up the drive and the threaded sleeve 68 will be forced toward the left and through the agency of collar 72 will force the weights 43 to again assume their inner position, as shown in Fig. 1, and the increased load will be taken care of by the reduced driving ratio of the low gear train, including gears 13, 88, 89, and 52.

It is obvious that if the vehicle speed is high enough, it is not ordinarily desirable to change to a lower speed under light engine throttle but it may be desirable under wide open throttle. The spring 74 has been provided which is adapted to be engaged by the collar 71 at some predetermined speed which ordinarily corresponds to approximately fifteen miles an hour in the use of the improved transmission upon an automobile. Spring 74 is under sufficient initial compression to resist further outward movement of weights 43 until a vehicle speed of about twenty miles per hour is reached or, in other words, the clutch pressure is substantially constant between 15 and 20 miles per hour but beyond this speed, the spring is compressed and additional pressure is placed on the clutch discs. It is preferred to regulate the capacity of the clutch so it will not transmit the full engine torque between these speeds but will transmit nearly the full torque. With this arrangement, it may be seen that no gear change will occur between 15 and 20 miles per hour unless the operator intentionally operates the vehicle engine at full throttle.

The reverse motion of propelling shaft 19 may be obtained by moving gear 21 toward the right, as viewed in Fig. 1, from the neutral position illustrated, until teeth 21 come into mesh with idler gear 92, whereupon the aforementioned high and low speed gears are disengaged and the motion is transmitted around the friction clutch and second speed gear by the gear train, including gears 13, 88, 91, 92, and 21.

Figure 4:
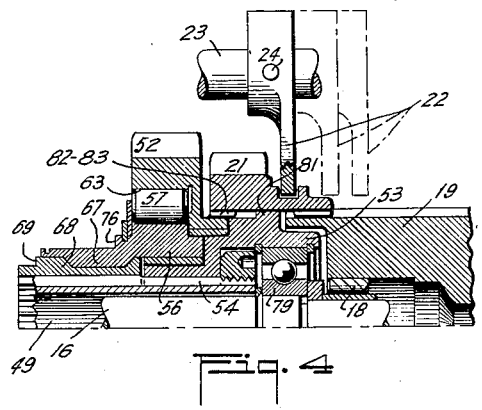
Fig. 4 is a view partly in section of the rear portion of the transmission illustrating the position of the gears in positive second forward speed.
Figure 7:
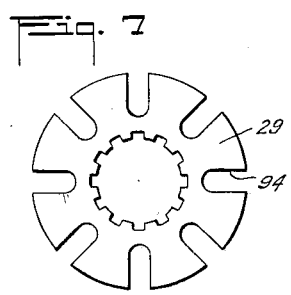
Fig. 7 is a detailed view of one of the driving clutch plates.
Figure 6:
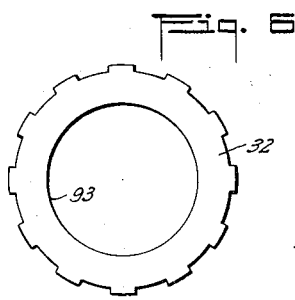
Fig. 6 is a detailed view of one of the driving clutch plates.

Under some conditions of automobile use, it is desirable to use the engine as a brake while the transmission is in second speed gear, and such action may be obtained by sliding gear 21 toward the left until teeth 82 are in mesh with teeth 83 of gear 52, this position being shown in Fig. 4. It may be readily seen that in this position of the slidable gear 21, the propelling shaft 19 is positively locked to the outer race of gear 52 and motion may be transmitted to driving shaft 10 by the gear train, including gears 52, 88, 89, and 13.

It should be noted that gradual engagement of the friction discs 29 and 32 is secured by two different means, one of which includes the resilient backing plate 36 which is adapted to move away from weights 43, and the other of which is a provision for the free circulation of oil between the plates; it being understood that transmissions of this type are ordinarily provided with a considerable supply of lubricant. The outer or driving friction discs 32 are provided with an initial opening 93, and the inner discs 29 are provided with outwardly opening slots 94 which are adapted to overlap the opening 93 and permit the entrance of oil to the contacting surfaces of the plates when they are separated. This film of oil is present on the clutch plates in their disengaged relation and must be squeezed from their surfaces before the clutch can transmit any substantial amount of driving torque, and it will be readily understood that the initial slipping action of the clutch disc will scrape the oil from their surfaces into the slots 94, from which it may be thrown outwardly to the clutch housing and pass through the openings 96 to the outside of the clutch and into the transmission housing.

While a preferred embodiment of the invention has been illustrated and described, it is understood that this showing and description are illustrative only and that the invention is not limited to the form shown and described, or otherwise, except by the terms of the following claims:

What is claimed is:

1. In a transmission mechanism, a driving shaft, a driven shaft, a clutch having friction members adapted to connect the shafts in a high speed ratio, centrifugal weights for actuating the clutch, a gear train including an overrunning clutch connecting the shafts around the clutch at a lower speed ratio, and a nut slidable on the driven shaft actuated by the load on the gear train arranged to urge the weights to their inward inoperative position.

2. In a transmission mechanism, a driving shaft, a driven shaft, a clutch having friction members adapted to connect the shafts in a high speed ratio, centrifugal weights for actuating the clutch, a gear train including an overrunning clutch connecting the shafts at a lower speed ratio torque actuated, means including a nut slidable on the driven shaft actuated by the lower speed ratio means arranged to urge the weights to their inward inoperative position and hold the clutch in a disengaged position at a predetermined load and speed of the driven shaft.

3. In an automatic transmission mechanism, a driving shaft, a driven shaft, means including a friction clutch for connecting the shafts in a high speed ratio, a gear train including an overrunning clutch for connecting the shafts around the clutch in a low speed ratio, centrifugal weights for actuating the high speed clutch, and torque operated means cooperating with the gear train for engaging the weights and urging them to an inoperative position when the low speed connection is operative.

4. In an automatic transmission mechanism, a driving shaft, a driven shaft, means for connecting the shafts in a high speed ratio, means for connecting the shafts in a low speed ratio, a clutch having coacting friction members in series with the high speed driving connection, centrifugal weights for actuating the clutch, torque operated means for engaging the weights and urging them to an inoperative position when the low speed connection is operative and said low speed driving connection including an overrunning clutch.

5. In an automatic transmission mechanism, a driving shaft, a driven shaft, a friction clutch having coacting friction members for connecting the shafts, a clutch housing, centrifugal weights on the housing adapted to press the members into contact, a backing plate for the members, spring means coacting between the housing and plate for urging the plate toward the members, a gear train connecting the shafts including an overrunning clutch, and torque actuated means cooperating with the gear train for engaging the weights to control the clutch.

6. In an automatic transmission mechanism, a driving shaft, a driven shaft, a friction clutch having coacting friction members for connecting the shafts, a clutch housing connected to the driven shaft, centrifugal weights on the housing adapted to press the members into contact, a backing plate for the members, spring means coacting between the housing and plate for urging the plate toward the members, torque actuated means opposing outward movement of the weights, and means including a gear connected to the driven shaft through an overrunning clutch for rotating the driven shaft at a reduced speed when the weights are in their inward position.

7. In an automatic transmission, a driving shaft, a driven shaft, means for directly connecting the shafts including a friction clutch, centrifugal weights for actuating the clutch, torque actuated means opposing outward movement of the weights, means other than the torque actuated means opposing the weights after a predetermined outward movement, and means for operatively connecting the shafts in a different driving ratio when the clutch is disengaged.

8. In an automatic transmission, a driving shaft, a driven shaft, means for directly connecting the shafts including a friction clutch, centrifugal weights for actuating the clutch, torque actuated means opposing outward movement of the weights, means other than the torque actuated means opposing the weights after a predetermined outward movement, and a gear train including an overrunning clutch connecting the shafts around the friction clutch.

9. In an automatic transmission, a driving shaft, a driven shaft, a friction clutch for connecting the shafts in a high speed ratio, means for connecting the shafts in a low speed ratio, means for disconnecting the low speed means when the clutch is engaged, centrifugal weights for engaging the clutch, and resilient means opposing movement of the weights after a predetermined outward movement thereof.

10. In an automatic transmission, a driving shaft, a driven shaft, a friction clutch for connecting the shafts in a high speed ratio, means for connecting the shafts in a low speed ratio, means for disconnecting the low speed means when the clutch is engaged, centrifugal weights for engaging the clutch, resilient means opposing movement of the weights after a predetermined outward movement thereof, and torque actuated means opposing outward weight movement.

11. In an automatic transmission, a driving shaft, a driven shaft, a friction clutch for connecting the shafts in a high speed ratio, means for connecting the shafts in a low speed ratio, means for disconnecting the low speed means when the clutch is engaged, centrifugal weights for engaging the clutch, resilient means opposing movement of the weights after a predetermined outward movement thereof, said clutch being axially movable by the force of said weights, and resilient means opposing clutch movement by the weights.

12. In an automatic transmission mechanism, a driving shaft, a driven shaft, gear means connecting the shafts in a low speed ratio including an overrunning device, a plurality of discs operatively connected to the driving and driven shafts respectively, a resilient backing plate for the discs having a limited movement toward the plates, centrifugal weights responsive to driven shaft speed for clamping the plates against the backing plate, and torque actuated means for influencing movement of the weights.

13. In an automatic transmission mechanism a driving shaft, a driven shaft, gear means connecting the shafts in a low speed ratio including an overrunning device, a plurality of discs operatively connected to the driving and driven shafts respectively, a resilient backing plate for the discs having a limited movement toward the plates, centrifugal weights responsive to driven shaft speed for clamping the plates against the backing plate, torque actuated means for influencing movement of the weights, and a resilient stop positioned to restrict outward movement of the weights.

14. In an automatic transmission mechanism, a driving shaft, a driven shaft, a friction clutch for directly connecting the shafts, centrifugal weights for controlling the clutch, means including gears and a countershaft for connecting the driving and driven shafts around the clutch, one of said gears having a hub and a rim portion with an overrunning clutch therebetween, said hub having a threaded portion coacting with a nut slidably connected to the driven shaft, said nut being movable in response to driven shaft load and arranged to contact the weights and disengage the high speed clutch.

15. In an automatic transmission mechanism, a driving shaft, a driven shaft, a friction clutch for directly connecting the shafts, centrifugal weights for controlling the clutch, means including gears and a countershaft for connecting the driving and driven shafts around the clutch, one of said gears having a hub and a rim portion with an overrunning clutch therebetween, said hub having a threaded portion coacting with a nut slidably connected to the driven shaft, said nut being movable in response to driven shaft load and arranged to contact the weights and disengage the high speed clutch, and spring means coacting between the nut and clutch for opposing movement of the nut by the driven shaft load.

16. In an automatic transmission mechanism, a driving shaft, a driven shaft, a friction clutch for connecting the shafts, weights rotatable at driven shaft speed for engaging the clutch, springs for urging the weights outwardly to lightly engage the clutch, a countershaft having a pair of gears thereon, a gear on the driving shaft engaging one of said countershaft gears, a gear including an overrunning clutch engaging the other of said countershaft gears, a nut having a splined connection with the driven shaft and a threaded connection with the gear having the overrunning clutch, and said nut being movable in response to an increase in load on the driven shaft to engage the weights and overcome both the centrifugal force of the weights and the force of the springs to disengage the friction clutch.

17. In an automatic transmission mechanism, a driving shaft, a driven shaft, a friction clutch for connecting the shafts, weights rotatable at driven shaft speed for engaging the clutch, springs for urging the weights outwardly to lightly engage the clutch, a countershaft having a pair of gears thereon, a gear on the driving shaft engaging one of said countershaft gears a gear including an overrunning clutch engaging the other of said countershaft gears, a nut having a splined connection with the driven shaft and a threaded connection with the gear having the overrunning clutch, said nut being movable in response to an increase in load on the driven shaft to engage the weights and overcome both the centrifugal force of the weights and the force of the springs to disengage the friction clutch, said nut being movable axially of the driven shaft by the weights upon a decrease of load on the driven shaft, and a resilient stop for the nut opposing outward movement of the weights upon a predetermined movement of the nut.

18. In an automatic transmission mechanism, a driving shaft, a driven shaft, a friction clutch for connecting the shafts, a gear train including an overrunning clutch connecting said shafts around the clutch, means for controlling the clutch by the combined action of driven shaft speed and load including weights rotatable with the driven shaft and a nut movable on the driven shaft by torque reaction to oppose outward movement of the weights as the load increases, springs for urging the weights outwardly to lightly engage the clutch, other springs for urging the clutch toward the weights, and a stop for limiting clutch movement toward the weights.

19. In a transmission mechanism, a driving shaft, a driven shaft, a clutch having friction members adapted to connect the shafts in a high speed ratio, centrifugal weights for actuating the clutch, a gear train including an overrunning clutch connecting the shafts at a lower speed ratio, means including a nut slidably connected to the driven shaft actuated by the lower speed ratio means arranged to urge the weights to their inward inoperative position to disengage the clutch.

20. In an automatic transmission mechanism, a driving shaft, a driven shaft, means for connecting the shafts in a high speed ratio, means for connecting the shafts in a low speed ratio, a clutch having coacting friction members in series with the high speed driving connection, centrifugal weights for actuating the clutch, torque operated means including a torque responsive nut on the driven shaft for engaging the weights and urging them to an inoperative position when the low speed connection is operative, and a resilient backing plate for the clutch friction members.

21. In a transmission mechanism, a driving shaft, a driven shaft, a clutch having friction members for connecting the shafts in a high speed gear ratio, members pivoted on the clutch for forcing the friction members into contact with each other, a gear train including an overrunning clutch connecting the shafts around the clutch at a lower speed ratio, a nut axially movable on one of said shafts and actuated by load on the gear train to engage the pivoted members and disengage the clutch.

22. In a transmission mechanism, a driving shaft, a driven shaft, a clutch having friction members for connecting the shafts in a high speed gear ratio, members pivoted on the clutch for forcing the friction members into contact with each other, a gear train including an overrunning clutch connecting the shafts around the clutch at a lower speed ratio, a nut threaded upon the driven shaft and actuated by load on the gear train to engage the pivoted members and disengage the clutch.

ROMEO M. NARDONE.